US012646500B2

(12) United States Patent
Zivkovic et al.

(10) Patent No.: US 12,646,500 B2
(45) Date of Patent: Jun. 2, 2026

(54) TRAINING SPEECH RECOGNIZERS BASED ON BIASED TRANSCRIPTIONS

(71) Applicant: Google LLC, Mountain View, CA (US)

(72) Inventors: Dragan Zivkovic, Sunnyvale, CA (US); Ágoston Weisz, Zurich (CH)

(73) Assignee: Google LLC, Mountain View, CA (US)

(*) Notice: Subject to any disclaimer, the term of this patent is extended or adjusted under 35 U.S.C. 154(b) by 439 days.

(21) Appl. No.: 18/161,608

(22) Filed: Jan. 30, 2023

(65) Prior Publication Data

US 2024/0257799 A1 Aug. 1, 2024

(51) Int. Cl.
| | |
|---|---|
| *G06F 40/205* | (2020.01) |
| *G10L 15/06* | (2013.01) |
| *G10L 15/08* | (2006.01) |
| *G10L 15/22* | (2006.01) |

(52) U.S. Cl.
CPC ............ *G10L 15/063* (2013.01); *G10L 15/08* (2013.01); *G10L 15/22* (2013.01); *G10L 2015/0636* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 9,691,380 B2 * | 6/2017 | Moreno Mengibar | ...................... G10L 15/197 |
| 2012/0166365 A1 * | 6/2012 | Tur | ......................... G06F 9/453 706/11 |

| | | | |
|---|---|---|---|
| 2015/0279360 A1 * | 10/2015 | Mengibar | ............. G06F 40/205 704/257 |
| 2017/0162203 A1 * | 6/2017 | Huang | ................... G10L 15/197 |
| 2017/0270929 A1 * | 9/2017 | Aleksic | ................... G10L 15/22 |
| 2018/0053502 A1 * | 2/2018 | Biadsy | .................... G10L 15/08 |
| 2022/0108222 A1 * | 4/2022 | Brannon | ................ G06N 20/00 |
| 2022/0188567 A1 * | 6/2022 | Ganesan | ................. G06N 3/02 |
| 2022/0383621 A1 * | 12/2022 | Patil | ................... G06F 18/2148 |

(Continued)

FOREIGN PATENT DOCUMENTS

| | | |
|---|---|---|
| WO | 2011028842 A2 | 3/2011 |

OTHER PUBLICATIONS

International Search Report and Written Opinion issued in related PCT Application No. PCT/US2024/012509, dated Apr. 8, 2024.

*Primary Examiner* — Seong-Ah A Shin
(74) *Attorney, Agent, or Firm* — Honigman LLP; Brett A. Krueger; Grant Griffith

(57) ABSTRACT

A method includes receiving a biased transcription for a voice command spoken by a user and captured by a user device, the biased transcription biased to include a biasing phrase from a set of biasing phrases specific to the user. The method also includes instructing an application executing on the user device to perform an action specified by the biased transcription for the voice command, and receiving one or more user behavior signals responsive to the application performing the action specified by the biased transcription. The method further includes generating, as output from a confidence model, a confidence score of the biased transcription based on the one or more user behavior signals input to the confidence model and, based on the confidence score output from the confidence model, training a speech recognizer on the biased transcription.

24 Claims, 6 Drawing Sheets

(56)        References Cited

U.S. PATENT DOCUMENTS

| | | | |
|---|---|---|---|
| 2023/0008904 A1* | 1/2023 | Venkataraman ....... | G06N 20/00 |
| 2023/0136125 A1* | 5/2023 | Sharma Mittal ......... | G06N 3/08 |
| | | | 382/103 |
| 2024/0071367 A1* | 2/2024 | Bera ..................... | G06F 3/0484 |
| 2024/0363125 A1* | 10/2024 | Khoury .................. | G10L 17/08 |

* cited by examiner

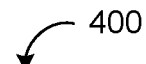

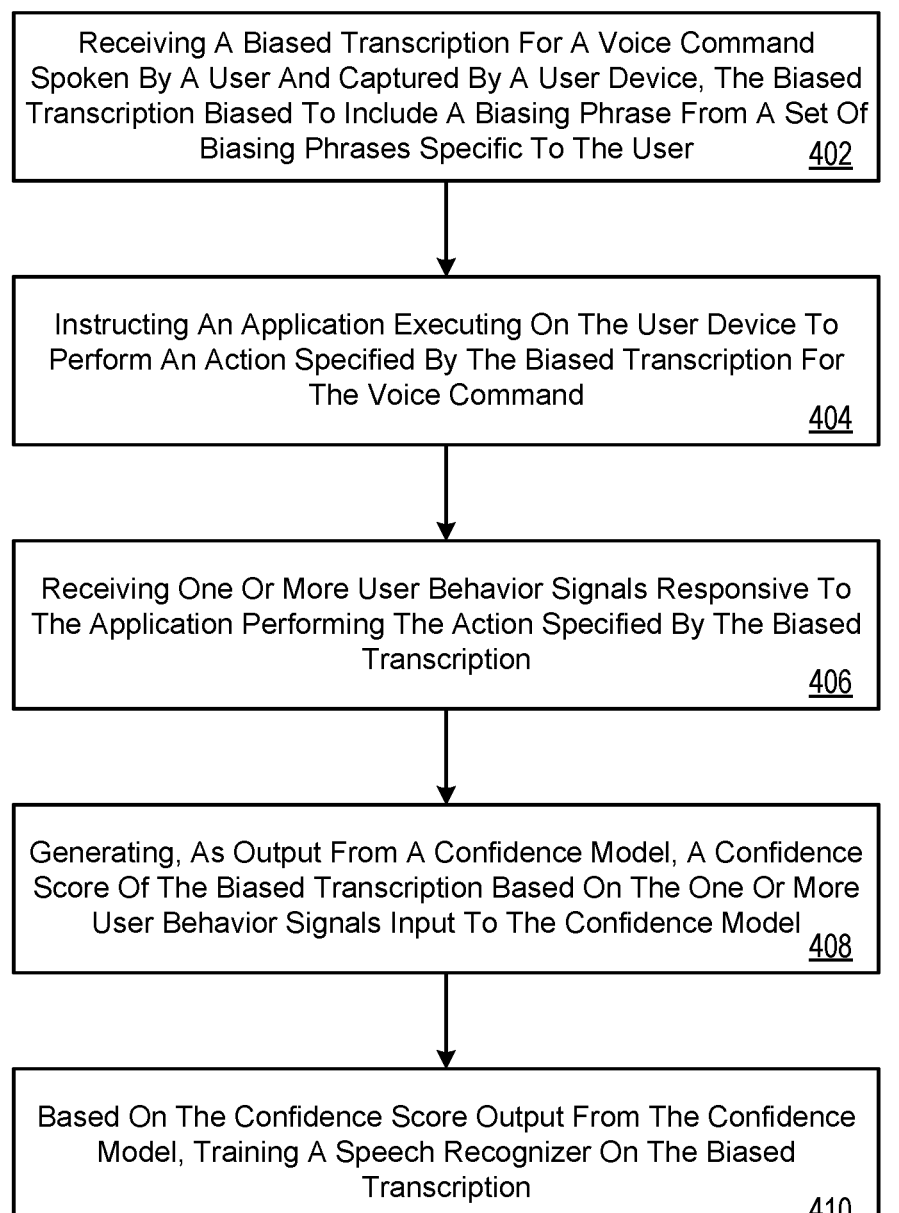

Receiving A Biased Transcription For A Voice Command Spoken By A User And Captured By A User Device, The Biased Transcription Biased To Include A Biasing Phrase From A Set Of Biasing Phrases Specific To The User    402

Instructing An Application Executing On The User Device To Perform An Action Specified By The Biased Transcription For The Voice Command    404

Receiving One Or More User Behavior Signals Responsive To The Application Performing The Action Specified By The Biased Transcription    406

Generating, As Output From A Confidence Model, A Confidence Score Of The Biased Transcription Based On The One Or More User Behavior Signals Input To The Confidence Model    408

Based On The Confidence Score Output From The Confidence Model, Training A Speech Recognizer On The Biased Transcription    410

FIG. 4

TRAINING SPEECH RECOGNIZERS BASED ON BIASED TRANSCRIPTIONS

TECHNICAL FIELD

This disclosure relates to biased speech recognition.

BACKGROUND

Automatic speech recognition (ASR) systems provide a technology that is increasingly used in mobile devices and other devices to, for example, enable a user to interact with a device using spoken voice commands. In general, ASR systems attempt to determine accurate transcriptions of what a user speaks to a device. However, in some instances, an ASR system generates an inaccurate transcription that does not match what the user spoke. This is often the case when the user spoke a unique word unknown to the ASR system, such as the name of a contact, the title of media content, or an address.

SUMMARY

One aspect of the disclosure provides a computer-implemented executed on data processing hardware that causes the data processing hardware to perform operations that include receiving a biased transcription for a voice command spoken by a user and captured by a user device, the biased transcription biased to include a biasing phrase from a set of biasing phrases specific to the user, and instructing an application executing on the user device to perform an action specified by the biased transcription for the voice command. The operations also include receiving one or more user behavior signals responsive to the application performing the action specified by the biased transcription, generating, as output from a confidence model, a confidence score of the biased transcription based on the one or more user behavior signals input to the confidence model, and, based on the confidence score output from the confidence model, training a speech recognizer on the biased transcription.

Implementations of the disclosure may include one or more of the following optional features. In some examples, the operations further include receiving audio data characterizing the voice command captured by the user device, processing, using the speech recognizer, the audio data to generate one or more candidate hypotheses for the voice command, each candidate hypothesis corresponding to a candidate transcription for the voice command and represented by a respective sequence of hypothesized terms, identifying, from the one or more candidate hypotheses for the voice command, a particular carrier phrase, and, based on the particular carrier phrase, biasing, using a biasing model, the one or more candidate hypotheses toward the set of biasing phrases specific to the user to determine the biased transcription that includes the biasing phrase. In some implementations, training the speech recognizer on the biased transcription includes determining the confidence score output from the confidence model satisfies a confidence threshold, generating a personalized training data pair that includes the biased transcription paired with the audio data characterizing the voice command, and training the speech recognizer on the personalized training data pair. In some examples the particular carrier phrase includes a phrase intended to invoke a voice calling application or a messaging application, the application instructed to perform the action specified by the biased transcription of the voice command includes the voice calling application or the messaging application, and the set of biasing phrases specific to the user includes personal contacts of the user. In other examples, the particular carrier phrase includes a phrase intended to invoke a media player application, the application instructed to perform the action specified by the biased transcription of the voice command includes the media player application, and the set of biasing phrases specific to the user includes a list of names present in a content playlist for the media player application. In further examples, the particular carrier phrase includes a phrase intended to invoke a navigation application, the application instructed to perform the action specified by the biased transcription of the voice command includes the navigation application, and the set of biasing phrases specific to the user includes at least one of street names, city names, or relevant points of interest. The operations may include selecting, based on the particular carrier phrase, the set of biasing phrases from a plurality of sets of biasing phrases. The biasing model may include an external language model. The language model may include a neural finite state transducer.

In some implementations, the speech recognizer includes an end-to-end speech recognition model. In some examples, the speech recognizer includes a language model. In some implementation, the confidence model includes a heuristically-based model or a trained machine learning model. Here, the confidence model is configured to receive, as input, the one or more user behavior signals responsive to the application performing the action specified by the biased transcription, and generate, as output, the confidence score, the confidence score indicating a probability/likelihood that the biased transcription is correct.

Another aspect of the disclosure provides a system that includes data processing hardware and memory hardware in communication with the data processing hardware. The memory hardware stores instructions that when executed on the data processing hardware causes the date processing hardware to perform operations that include receiving a biased transcription for a voice command spoken by a user and captured by a user device, the biased transcription biased to include a biasing phrase from a set of biasing phrases specific to the user, and instructing an application executing on the user device to perform an action specified by the biased transcription for the voice command. The operations also include receiving one or more user behavior signals responsive to the application performing the action specified by the biased transcription, generating, as output from a confidence model, a confidence score of the biased transcription based on the one or more user behavior signals input to the confidence model, and, based on the confidence score output from the confidence model, training a speech recognizer on the biased transcription.

Implementations of the disclosure may include one or more of the following optional features. In some examples, the operations further include receiving audio data characterizing the voice command captured by the user device, processing, using the speech recognizer, the audio data to generate one or more candidate hypotheses for the voice command, each candidate hypothesis corresponding to a candidate transcription for the voice command and represented by a respective sequence of hypothesized terms, identifying, from the one or more candidate hypotheses for the voice command, a particular carrier phrase, and, based on the particular carrier phrase, biasing, using a biasing model, the one or more candidate hypotheses toward the set of biasing phrases specific to the user to determine the biased transcription that includes the biasing phrase. In some implementations, training the speech recognizer on the biased transcription includes determining the confidence score output from the confidence model satisfies a confidence threshold, generating a personalized training data pair that includes the biased transcription paired with the audio data characterizing the voice command, and training the speech recognizer on the personalized training data pair. In some examples the particular carrier phrase includes a phrase intended to invoke a voice calling application or a messaging application, the application instructed to perform the action specified by the biased transcription of the voice command includes the voice calling application or the messaging application, and the set of biasing phrases specific to the user includes personal contacts of the user. In other examples, the particular carrier phrase includes a phrase intended to invoke a media player application, the application instructed to perform the action specified by the biased transcription of the voice command includes the media player application, and the set of biasing phrases specific to the user includes a list of names present in a content playlist for the media player application. In further examples, the particular carrier phrase includes a phrase intended to invoke a navigation application, the application instructed to perform the action specified by the biased transcription of the voice command includes the navigation application, and the set of biasing phrases specific to the user includes at least one of street names, city names, or relevant points of interest. The operations may include selecting, based on the particular carrier phrase, the set of biasing phrases from a plurality of sets of biasing phrases. The biasing model may include an external language model. The language model may include a neural finite state transducer.

In some implementations, the speech recognizer includes an end-to-end speech recognition model. In some examples, the speech recognizer includes a language model. In some implementation, the confidence model includes a heuristically-based model or a trained machine learning model. Here, the confidence model is configured to receive, as input, the one or more user behavior signals responsive to the application performing the action specified by the biased transcription, and generate, as output, the confidence score, the confidence score indicating a probability/likelihood that the biased transcription is correct.

The details of one or more implementations of the disclosure are set forth in the accompanying drawings and description below. Other aspects, features, and advantages will be apparent from the description and drawings, and from the claims.

DESCRIPTION OF DRAWINGS

FIG. 4 is a flowchart of an exemplary arrangement of operations for a method for training a speech recognizer based on biased transcriptions.

Like reference symbols in the various drawings indicate like elements.

DETAILED DESCRIPTION

Figure 1:
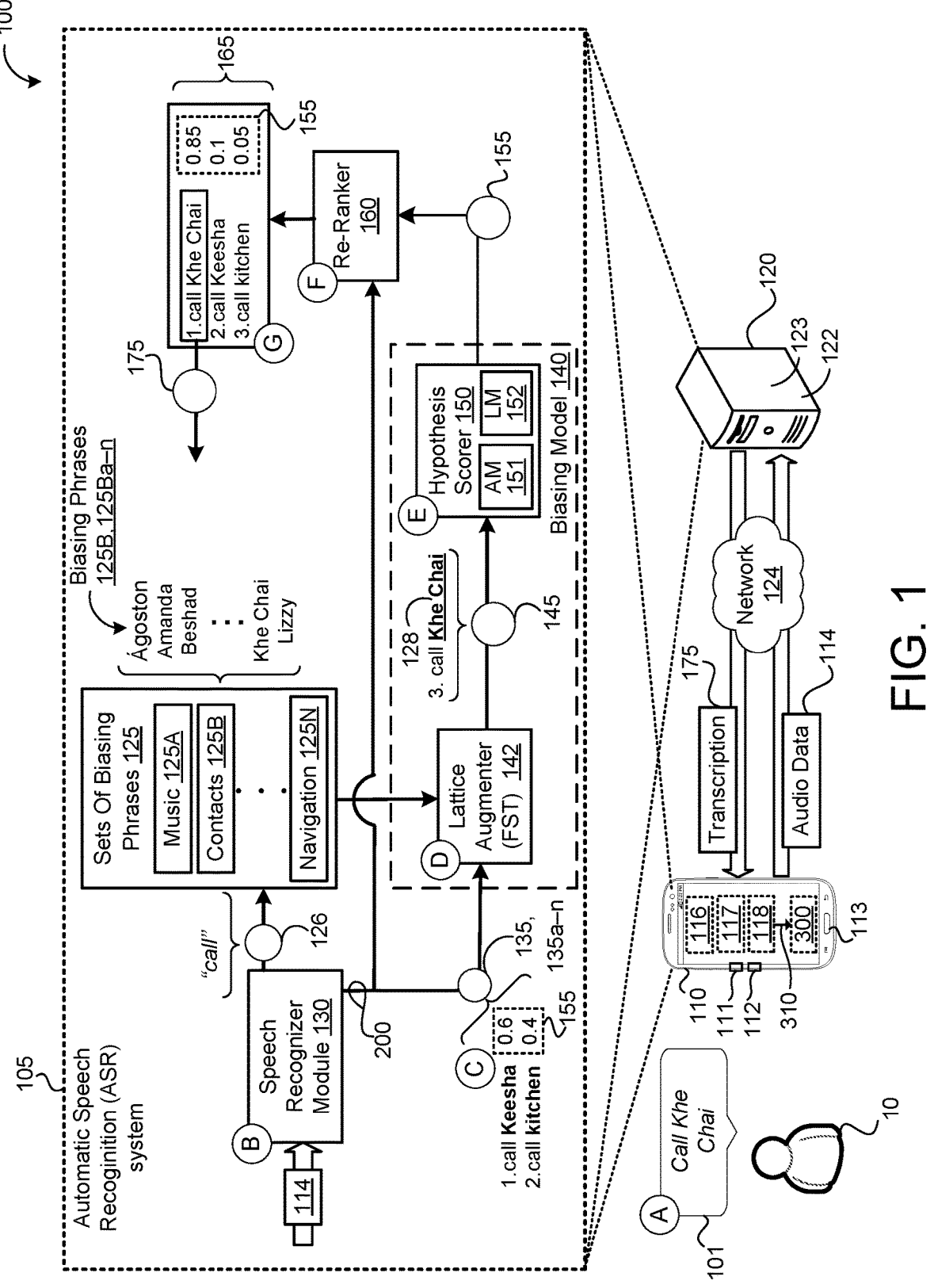
FIG. 1 is a schematic view of an example system including an automatic speech recognition (ASR) system for performing speech recognition.

Automatic speech recognition (ASR) systems provide a technology that is increasingly used in mobile devices and other devices to, for example, enable a user to interact with a device using spoken voice commands. In general, ASR systems attempt to determine accurate transcriptions of what a user speaks to a device. However, in some instances, an ASR system generates an inaccurate transcription that does not match what the user spoke. This is often the case when the user speaks a unique word unknown to the ASR system, such as the name of a contact, the title of media content, or an address. For example, "call Khe Chai" and "call kitchen" sound very much alike and it may be difficult for an ASR system to disambiguate which phrase the user intended to convey. To overcome such instances, a ASR system may perform biased speech recognition. In particular, a speech recognizer of the ASR system receives captured audio data characterizing a voice command spoken by a user and processes the captured audio data to generate and rank one or more candidate hypotheses for the voice command. Here, each candidate hypothesis corresponds to a candidate transcription for the voice command. The ASR system then determines whether any words or phrases in the candidate hypotheses require biasing on the basis of the candidate hypotheses including a particular carrier phrase. For instance, recognition of a particular carrier phrase may classify a type or domain of a query spoken by a user that may be used to indicate that the spoken voice command may require biasing toward a unique word (also referred to as a 'proper noun') that is associated with the type or domain of the query and is un- or less-known to the speech recognizer. That is, a proper noun may refer to a phrase of one or more terms that are less prevalent, or even non-existent, in training data used to train the speech recognizer. Example carrier phrases include "call . . . ," "play . . . ," "send message to . . . ," and "directions to . . . " Such carrier phrases often indicate that the spoken voice command may require biasing toward a unique word personal to that user that may have been spoken in the query, such as the name of a contact, the title of media content, or an address. In such circumstances, the ASR system may perform biasing on an initial set of one or more candidate hypotheses using a set of biasing phrases specific to the user and associated with the particular carrier phrase recognized in the one or more candidate hypotheses. The ASR system then ranks the one or more biased hypotheses that may now include biasing phrases from the set of biasing phrases that were not present, or ranked lower, in the initial set of the one or more candidate hypotheses recognized prior to performing biasing. Here, each biased hypothesis corresponds to a biased candidate transcription for the voice command. Example biasing phrases include, but are not limited to, entries taken from a database of music (e.g., a music playlist), a contacts list, a calendar, a reminder list, a list of streets proximate to a current location of the user device, a list of streets recently or frequently navigated, a list of streets, a list of city names, a list of relevant points of interest, and a database of audio/video media content. The ASR system then selects, as an output transcription, the highest ranked (i.e., most likely) hypothesis from the ranked list of biased hypotheses.

Biasing, while improving accuracy of transcriptions recognized by ASR systems, is often implemented as a post processing step after an initial speech recognition pass by leveraging additional logic and heuristics, and thus, increases computational requirements of the device running the ASR system and introduces additional latency impacting user experience. Thus, performing speech recognition to attain accurate transcriptions without the need to apply additional biasing is preferable, especially when the ASR system is implemented on a user device. Implementations herein are directed toward systems and methods of determining whether and how to update the speech recognizer of a ASR system based on biased transcriptions. The ASR systems disclosed herein that apply biasing are capable of capturing and using behavior signals representing one or more behaviors of a user responsive to the performance of an action specified by a biased transcription to determine a confidence score that represents how likely it is that the user actually spoke the biased transcription. For instance, for a biased transcription of "call Dan Smith" (i.e., a voice command to initiate a call to "Dan Smith"), where "Dan Smith" is listed in the user's contacts and a voice calling application on the user's device automatically triggers a telephone call to "Dan Smith" as an action specified by the biased transcription, example behavior signals include, but are not limited to, a length of the call (e.g., a longer call is more indicative of an intention to call "Dan Smith" than a very short call), whether the user cancels the call while the call is connecting or "Dan Smith" answers his phone, whether the user opens their contact list and manually selects a different contact to place a call after canceling the call to "Dan Smith", and how phonetically similar "Dan Smith" is to the captured audio data characterizing the voice command. In some implementations, a model (e.g., a heuristically-based model, or a trained machine learning (ML) model such as a classification model) processes the behavior signals to determine the confidence score. When the confidence score satisfies a criteria (e.g., exceeds a pre-determined threshold), the captured audio is paired with the biased transcription as a ground truth to form a personalized training data pair, and the personalized training data pair is used to personalize (e.g., update) the speech recognizer to increase a likelihood of the speech recognizer recognizing subsequent utterances of the biasing phrase. In some implementations, such personalized training data pairs based on biased transcriptions are cached and subsequently used to batch personalize the speech recognizer to recognize biasing phrases and/or biased transcriptions. In some examples, once the speech recognizer is trained to recognize a biasing phrase, the biasing phrase is no longer considered during future biasing, which may decrease computational expense for the ASR system and make it more feasible to implement the ASR system on a user device, and/or reduce speech recognition latency. That is, the ASR system may become less dependent on biasing to perform accurate speech recognition for voice commands or other spoken utterances.

FIG. 1 illustrates an example of a system 100 including an automatic speech recognition (ASR) system 105 for performing automatic speech recognition of a voice command 101 spoken by a user 10. The system 100 includes a user device 110, a computing system 120, and a network 124. The user device 110 includes data processing hardware 111 and memory hardware 112. The user device 110 may include one or more audio capture devices (e.g., microphone(s)) 113 for capturing and converting voice commands 101 spoken by the user 10 into the audio data 114 (e.g., electrical signals). In some examples, the microphone 113 is separate from the user device 110 and in communication with the user device 110 to provide the recorded audio data 114 to the user device 110. The user device 110 may be any computing device capable of communicating with the computing system 120 through the network 124. The user device 110 includes, but is not limited to, desktop computing devices and mobile computing devices, such as laptops, tablets, smart phones, smart speakers/displays, smart appliances, internet-of-things (IoT) devices, infotainment systems, vehicle infotainment systems, and wearable computing devices (e.g., headsets, smart glasses, and/or watches).

The computing system 120 may be a distributed system (e.g., a cloud computing environment) having scalable elastic resources. The resources include computing resources 122 (e.g., data processing hardware) and/or storage resources 123 (e.g., memory hardware). The network 124 may be wired, wireless, or a combination thereof, and may include private networks and/or public networks, such as the Internet.

In some examples, the user device 110 captures audio data 114 characterizing the voice command 101, and a speech recognizer module 130 of the ASR system 105 processes the audio data 114 to generate and rank one or more candidate hypotheses 135 for the voice command 101. Here, each candidate hypothesis 135 corresponds to a candidate transcription for the voice command 101 and is represented by a respective sequence of hypothesized terms. As described in greater detail below, for each candidate hypotheses 135, the computing system 120 is configured to determine whether the respective sequence of hypothesized terms includes a carrier phrase 126 such as, for example, "call . . . ," "play . . . ," "send message to . . . ," and "directions to . . . " Here, the carrier phrase 126 is indicative of one or more terms typically used to initiate a particular type of voice command. For instance, the carrier phrase "call" may invoke a calling application on the user device 110 to initiate a phone call to a name of a personal contact that was spoken in the voice command 101 subsequent to "call". When the respective sequence of hypothesized terms includes a carrier phrase 126, the computing system 120 uses the carrier phrase 126 to identify a set of biasing phrases 125 specific to the user 10, and performs biasing on the candidate hypotheses 135 to generate one or more biased hypotheses 145 that increase a likelihood toward inclusion of biasing phrases 125 present in the identified set of biasing phrases 125. Thereafter, the computing system 120 generates an output transcription 175 by selecting a highest ranking hypothesis from the candidate hypotheses 135 and the biased hypotheses 145.

FIG. 1 shows operations (A) to (G) which illustrate a flow of data. As described herein, the user device 110 performs operations (B) to (G). However, it is understood that the computing system 120 may also perform operations (B) to (G) in addition to, or in lieu of, the user device 110 performing the operations. In some examples, the user device 110 performs a first portion of the operations (e.g., operations (B) to (D)) and the computing system 120 performs a second portion of the operations (e.g., operations (E) to (G)), or vice-versa.

During stage (A), the user 10 speaks a voice command 101, and the microphone 113 of the user device 110 records the voice command 101 as audio data 114 characterizing the voice command 101. In this example, the voice command 101 includes the user 10 speaking "call Khe Chai."

During stage (B), the user device 110 processes the audio data 114 to generate one or more candidate hypotheses 135, 135a-n for the voice command 101. Here, each candidate hypothesis 135 corresponds to a candidate transcription for the voice command 101 and is represented by a respective sequence of hypothesized terms. For example, the user device 110 may execute a speech recognizer module 130 (also referred to herein as speech recognizer 130) for producing a word lattice 200 indicating the one or more candidate hypotheses 135 that may be possible for the voice command 101 based on the audio data 114. The speech recognizer 130 may evaluate potential paths through the word lattice 200 to determine the one or more candidate hypotheses 135. In some instances, a candidate hypothesis 135 includes a biasing phrase 125 when, for example, the speech recognizer 130 has been trained to recognize the biasing phrase 125. Here, the speech recognizer 130 includes a speech recognition model. For instance, the speech recognition model may include an end-to-end speech recognition model such as sequence-to-sequence transducer model suitable for performing streaming speech recognition on-device. In some implementations, the speech recognizer 130 includes a language model.

Figure 2A:
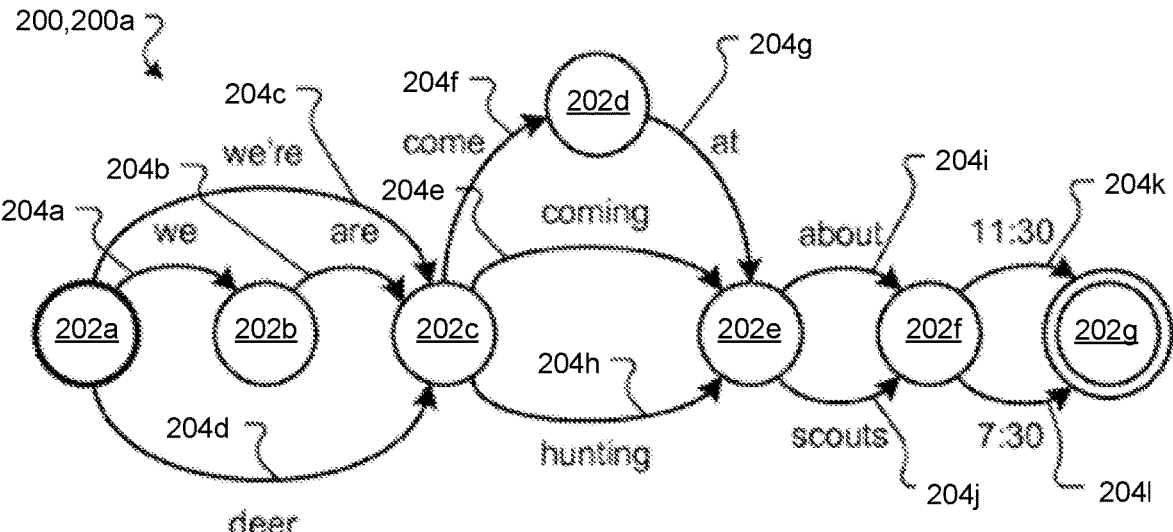
FIGS. 2A and 2B are schematic views of diagrams that illustrate examples of word lattices.

FIG. 2A is illustrates an example of a word lattice 200, 200*a* that may be provided by the speech recognizer 130 of FIG. 1. The word lattice 200*a* represents multiple possible combinations of words that may form different candidate hypotheses 135 for a voice command 101.

The word lattice 200*a* includes one or more nodes 202*a*-*g* that correspond to the possible boundaries between words. The word lattice 200*a* includes multiple edges 204*a*-1 for the possible words in the candidate hypotheses that result from the word lattice 200*a*. In addition, each of the edges 204*a*-1 may have one or more weights or probabilities of that edge being the correct edge from the corresponding node. The weights are determined by the speech recognizer 130 and may be based on, for example, a confidence in the match between the audio data 114 and the word for that edge and how well the word fits grammatically and/or lexically with other words in the word lattice 200*a*.

For example, initially, the most probable path (e.g., most probable candidate hypothesis 135) through the word lattice 200*a* may include the edges 204*c*, 204*e*, 204*i*, 204*k*, which have the text "we're coming about 11:30." A second best path (e.g., second best candidate hypothesis 135) through the word lattice 200*a* may include the edges 204*d*, 204*h*, 204*j*, 2041, which have the text "deer hunting scouts 7:30."

Each pair of nodes may have one or more paths corresponding to the alternate words in the various candidate hypotheses 135. For example, the initial most probable path between the node pair beginning at node 202*a* and ending at the node 202*c* is the edge 204*c* "we're." This path has alternate paths that include the edges 204*a*, 204*b* "we are" and the edge 204*d* "deer."

Figure 2B:
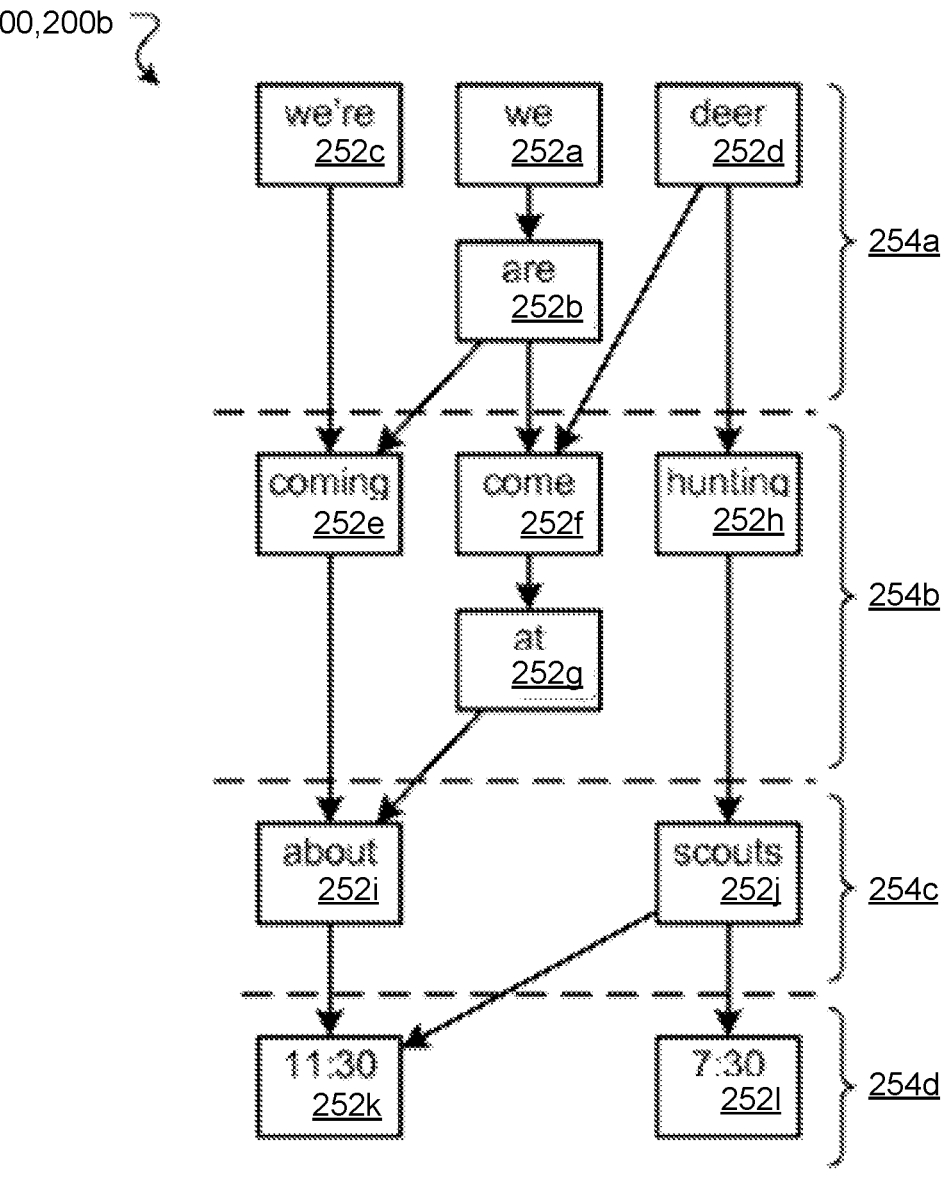

FIG. 2B is an example of a hierarchical word lattice 200, 200*b* that may be provided by the speech recognizer 130 of FIG. 1. The word lattice 200*b* includes nodes 252*a*-1 that represent words that make up the various candidate hypotheses 135 for a voice command 101. The edges between the nodes 252*a*-1 show that the possible candidate hypotheses 135 include: (1) the nodes 252*c*, 252*e*, 252*i*, 252*k* "we're coming about 11:30"; (2) the nodes 252*a*, 252*b*, 252*e*, 252*i*, 252*k* "we are coming about 11:30"; (3) the nodes 252*a*, 252*b*, 252*f*, 252*g*, 252*i*, 252*k* "we are come at about 11:30"; (4) the nodes 252*d*, 252*f*, 252*g*, 252*i*, 252*k* "deer come at about 11:30"; (5) the nodes 252*d*, 252*h*, 252*j*, 252*k* "deer hunting scouts 11:30"; and (6) the nodes 252*d*, 252*h*, 252*j*, 2521 "deer hunting scouts 7:30."

Again, the edges between the nodes 242*a*-1 may have associated weights or probabilities based on the confidence in the speech recognition (e.g., candidate hypothesis) and the grammatical/lexical analysis of the resulting text. In this example, "we're coming about 11:30" may currently be the best hypothesis and "deer hunting scouts 7:30" may be the next best hypothesis. One or more divisions, 354*a*-*d*, may be made in the word lattice 200*b* that group a word and its alternates together. For example, the division 254*a* includes the word "we're" and the alternates "we are" and "deer." The division 252*b* includes the word "coming" and the alternates "come at" and "hunting." The division 254*c* includes the word "about" and the alternate "scouts" and the division 254*d* includes the word "11:30" and the alternate "7:30."

Referring back to FIG. 1, the speech recognizer 130 may generate the one or more candidate hypotheses 135 from the word lattice 200. That is, the speech recognizer 130 generates likelihood scores 155 for each of the candidate hypotheses 135 of the word lattice 200. Each likelihood score 155 indicates a probability that the candidate hypotheses 135 is correct (e.g., matches the voice command 101). In some implementations, the speech recognizer 130 includes an end-to-end (E2E) speech recognition model such as a recurrent neural network-transducer (RNN-T) model configured to receive and process audio data 114 to generate the word lattice 200. In particular, the speech recognizer 130 processes the audio data 114 to generate corresponding likelihood scores 155 for each of the candidate hypotheses 135 from the word lattice 200. In some examples, the speech recognizer 130 includes separate acoustic, language and/or pronunciation models. The speech recognizer 130 may share an acoustic model and a language model with a hypothesis scorer 150, or have independent acoustic, language and/or pronunciation models.

In some examples, the speech recognizer 130 includes the acoustic model and/or the language model to generate the word lattice 200 or otherwise generate the one or more candidate hypotheses 135 for the voice command 101 based on the audio data 114. Here, the likelihood scores 155 of the candidate hypotheses 135 may include a combination of an acoustic modeling score from the acoustic model and/or a prior likelihood score from the language model. Put another way, the likelihood scores 155 includes at least one of the acoustic modeling score output by the acoustic model and/or the prior likelihood score output by the language model.

During stage (C), the user device 110 identifies a set of highest-ranking candidate hypotheses 135 from the candidate hypotheses 135 in the word lattice 200. For example, using likelihood scores 155 from the speech recognizer 130, the user device 110 selects n candidate hypotheses 135 with the highest likelihood scores 155, where n is an integer. In some instances, the user device 110 selects candidate hypotheses 135 with likelihood scores 155 that satisfy a likelihood score threshold for inclusion in the n-best list. Optionally, the speech recognizer 130 may rank the set of highest-ranking candidate hypotheses 135 using the likelihood scores 155.

In the example shown, the speech recognizer 130 generates candidate hypotheses 135 for the voice command 101 "call Khe Chai" spoken by the user 10. In this example, the top two candidate transcriptions (e.g., the two that are most likely to be correct) are selected as the set of highest ranking candidate hypotheses 135. The highest ranking candidate hypotheses 135 include a first candidate hypothesis 135 "call Keesha" with a likelihood score 155 of 0.6, and a second candidate hypotheses 135 "call kitchen" with a likelihood score 155 of 0.4. Here, a higher likelihood score 155 indicates a greater confidence that the candidate hypothesis 135 is correct. Notably, neither of the highest ranking candidate hypotheses 135 include the voice command 101 actually spoken by the user 10 (e.g., "call Khe Chai"). Accordingly, if the ASR system 105 selects either of the highest ranking candidate hypotheses 135, the resulting transcription 175 will be incorrect and the intended action specified by the voice command 101 will not be performed.

The ASR system 105 is configured to perform biasing toward a set of biasing phrases 125, 125*a-n* specific to the user 10. Specifically, the ASR system 105 may identify a particular carrier phrase 126 from the one or more candidate hypotheses 135 selected from the lattice 200, and based on the particular carrier phrase 126, select a relevant set of biasing phrases 125 for the biasing model 140 to use for biasing. Here, the carrier phrase 126 is indicative of one or more terms used to initiate a particular type of voice command. For instance, the carrier phrase "call" may invoke a calling application on the user device 110 to initiate a phone call to a name of a personal contact that was spoken in the voice command 101 subsequent to "call". The carrier phrase "play" may invoke a music player application to initiate playback of a song, album, or music from a particular artist present in a playlist of the user. Similarly, the carrier phrase "send message to" may be used to invoke a messaging application, while the carrier phrase "directions to . . . " may be used to invoke a navigation application.

Each set of biasing phrases 125 includes one or more biasing phrases 125 that each include one or more words that may be underrepresented in training data used to train the speech recognizer 130. Moreover, each set of biasing phrases 125, 125A-N may be associated with one or more carrier phrases 126. Example sets of biasing phrases 125 include, but are not limited to, a database of music 125A (e.g., a personalized music playlist of the user that includes artist names and album/song titles), a contacts list 125B (e.g., names, phone numbers, and addresses of personal contacts of the user), a calendar entries, entries in a reminder list, relevant navigation terms 125N (e.g., a list of cities/ streets/points-of-interest (POI) proximate to a current location of the user device 110, a list of cities/streets/POIs recently or frequently navigated by the user, etc.), and a database of media content (e.g., a list of movie titles present in a content playlist). Here, the biasing model 140 may bias the one or more candidate hypotheses 135 toward the set of biasing phrases 125A-N identified based on the carrier phrase 126 such that the resulting biased transcription 175 may include a biasing phrase 125 from the set of biasing phrases 125A-N. For example, the biasing phrase 125 in the biased transcription 175 may include a contact's name, a street address, the name of a song, the name of a movie, information regarding a meeting or appointment, a reminder, the name of a TV show, or other proper noun/unique term that was not present, or ranked low, in the one or more candidate hypotheses 135.

Accordingly, during stage (D), the user device 110 executes a biasing model 140 that includes a lattice augmenter 142 configured to receive, as input, the one or more candidate hypotheses 135 and the identified set of biasing phrases 125, and generate, as output, one or more biased hypotheses 145 that bias the one or more candidate hypotheses 135 toward the set of biasing phrases 125. In other words, the identified set of biasing phrases 125 specific to the user 10 in the context of the carrier phrase 126 are injected into the biasing model 140 for increasing the likelihood of the final transcription 175 including a biasing phrase 125 from the identified set of biasing phrases 125. In the example shown, the set of biasing phrases 125 associated with a contact list 125B specific to the user 10 is identified based on the example candidate hypotheses 135 "call Keesha" and "call kitchen" for the voice command "Call Khe Chai" 101 including the carrier phrase "call" 126 Continuing with this example, the lattice augmenter 142 uses the set of biasing phrases 125 including names of contacts present in the user's contact list to generate one or more biased hypotheses 145 that include biasing phrases 125B, 125Ba-n (e.g., contact names) present in the user's contact list 125B. For example, the lattice augmenter 142 may generate the biased hypothesis 145 of "call Khe Chai" which includes the biasing phrase 125 for the contact name "Khe Chai" present in the user's contact list 125B. Notably, the biasing phrase 125 "Khe Chai" is acoustically/phonetically similar to the terms Keesha and kitchen which were present in the candidate hypotheses 135.

In some implementations, during stage (E), the user device 110 executes a hypothesis scorer 150 of the biasing model 140 that is configured to determine a likelihood score 155 for each biased hypothesis 145 generated by the lattice augmenter 142. That is, simply generating a biased hypothesis 145 does not mean that the biased hypothesis 145 represents a correct transcription of the voice command 101. For example, the lattice augmenter 142 may generate a biased hypothesis "Call Ken Cup" 145 from the candidate hypothesis 135 of "Call Keesha" for a contact named "Ken Cup." In this example, the biased hypothesis "Call Ken Cup" 145 most likely has a lower likelihood score 155 than the biased hypothesis "Call Khe Chai" 145. As such, the user device 110 selects the hypothesis 135, 145 with the highest likelihood 155 to maximize a probability of an accurate output transcription 175.

In some instances, however, the hypothesis scorer 150 may be unable to generate an accurate likelihood score 155 for one or more of the biased hypotheses 145. That is, because one or more of the biasing phrases 125 may be out out-of-domain, out-of-vocabulary (OOV), and/or only include sparse training data. Accordingly, the hypothesis scorer 150 needs to generate likelihood scores 155 that accurately reflect the probability of whether the biased hypotheses 145 are correct.

The hypothesis scorer 150 may include at least one of an acoustic model 151 and/or a language model 152. The acoustic model 151 is configured to process the audio data 114 to determine an acoustic modeling score for a biased hypothesis 145. For example, the acoustic model 151 may determine the acoustic modeling score to indicate whether the portion of the audio data 114 associated with a target phrase is acoustically similar to corresponding biasing phrase 125 that replaced the target phrase. In some instances, the hypothesis scorer 150 may not be able to determine an acoustic modeling score for a biased hypothesis 145. For example, when a biasing phrase 125 is an OOV phrase, the hypothesis scorer 150 may be unable to compare the portion of the audio data 114 that may include the OOV.

In some examples, the language model 152 includes an auxiliary language model external to the speech recognizer 130. In other examples, the language model 152 includes an internal language model integrated with the speech recognizer 130. In some implementations, the language model 152 includes a neural finite state transducer (FST). In some examples, the language model 152 of the hypothesis scorer 150 is configured to receive each biased hypothesis 145 as input and determine a corresponding language model likelihood score. The language model likelihood score may indicate a probability for the biased hypothesis 145 based on probability data that indicates how frequently different sequences of terms occur are received by the language model 152. For example, the language model 152 may assign a higher language model likelihood score to a biased hypothesis "three blind mice" than to "tree blind mice"

because the former language sequence occurs more frequently in a corpus of utterances than does the latter.

The hypothesis scorer 150 determines a corresponding likelihood score 155 for each biased hypothesis 145 based on at least one of a corresponding acoustic modeling score and/or a corresponding language model likelihood score determined for the biased hypothesis 145. In some examples, the hypothesis scorer 150 scores each biased hypotheses 145 and re-scores each candidate hypotheses 135 together to generate likelihood scores 155 for the candidate and the biased hypotheses 135, 145.

During stage (F), the user device 110 executes a re-ranker 160 that receives the likelihood scores 155 for the candidate hypotheses 135 from the speech recognizer 130 (or the biasing model 140) and the likelihood scores 155 for the biased hypotheses 145 from the biasing model 140. The re-ranker 160 is configured to output a re-ranked result 165 that includes rankings for the candidate hypotheses 135 and the biased hypotheses 145 based on their respective likelihood scores 155. In the example shown, the re-ranked result 165 includes the biased hypotheses 145 with a likelihood score 155 of 0.85 as the most likely correct output transcription 175 and, thus, the output transcription 175 represents a biased transcription 175.

At stage (G), the user device 110 is configured to generate an output transcription 175 for the voice command 101 spoken by the user 10 by selecting the highest ranking candidate in the re-ranked result 165. As such, the user device 110 determines which one of the one or more candidate hypotheses 135 or the one or more biased hypotheses 145 has the highest likelihood score 155. In the example shown, the user device 110 selects the biased hypothesis 145 "call Khe Chai" as a biased output transcription 175 because the biased hypothesis 145 "call Khe Chai" has the highest likelihood score 155 of 0.85.

In the example shown, the user 10 interacts with a digital assistant application 116 executing on the user device 110 that uses the ASR system 105. The user 10 interacts with the digital assistant application 116 using voice commands and/or spoken queries. In some configurations, the output transcription 175 output by the ASR system 105 is processed, e.g., by a natural language processing/understanding (NLP/NLU) module executing on the user device 10 or the remote computing device 60 (not shown for clarity of illustrate), to execute a user command/query specified by the voice command 101. For instance, FIG. 1 depicts the user 10 commanding the digital assistant application 116 to instruct the user device 110 to initiate a phone call to "Khe Chai." In this example, the digital assistant application 116, in response to the biased transcription 175, instructs another application 117 (e.g., a voice calling application, a messaging application, a media player application, or a navigation application) to perform an action specified by the biased transcription 175. Here, the digital assistant application 116 instructs a voice calling application 117 to initiate a phone call to the phone number associated with the contact named "Khe Chai."

When the ASR system 105 outputs a biased transcription 175, the user device 110 executes a monitoring module 118 to capture or record one or more behavior signals 310, 310a-n that represent one or more actions of the user 10 responsive to the digital assistant application 116 instructing the application 117 to perform the action specified by the biased transcription 175. Here, the actions of the user 10 are representative of whether the biased transcription 175 was an accurate transcription for a voice command. In some implementations, the monitoring module 118 obtains the behavior signals 310 by recording and processing interactions between the user 10 and the application 117 associated with the application 117 performing the action. For the example of FIG. 1, example behavior signals 310 include, but are not limited to, the length of the call initiated by the voice calling application 117 (e.g., a longer call is likely indicative of an intention to call "Khe Chai" than a very short call); whether the user 10 immediately cancels the call before the call is connected with the receiving party or "Khe Chai" answers their phone (e.g., by pressing a "call end" user interface element); whether the user 10 cancels the call, opens their contact list 125b, and manually selects a different contact to initiates a call; how phonetically similar "Khe Chai" is to the captured audio data 114; and whether the user 10 repeats their voice command 101 to initiate a phone call. Other example behavior signals 310 include, but are not limited to, how long media content is played, whether the user 10 opens their media list and selects different media content to play, whether a user navigates to a particular address, street or point of interest, and whether the user 10 cancels sending a dictated message.

Figure 3:
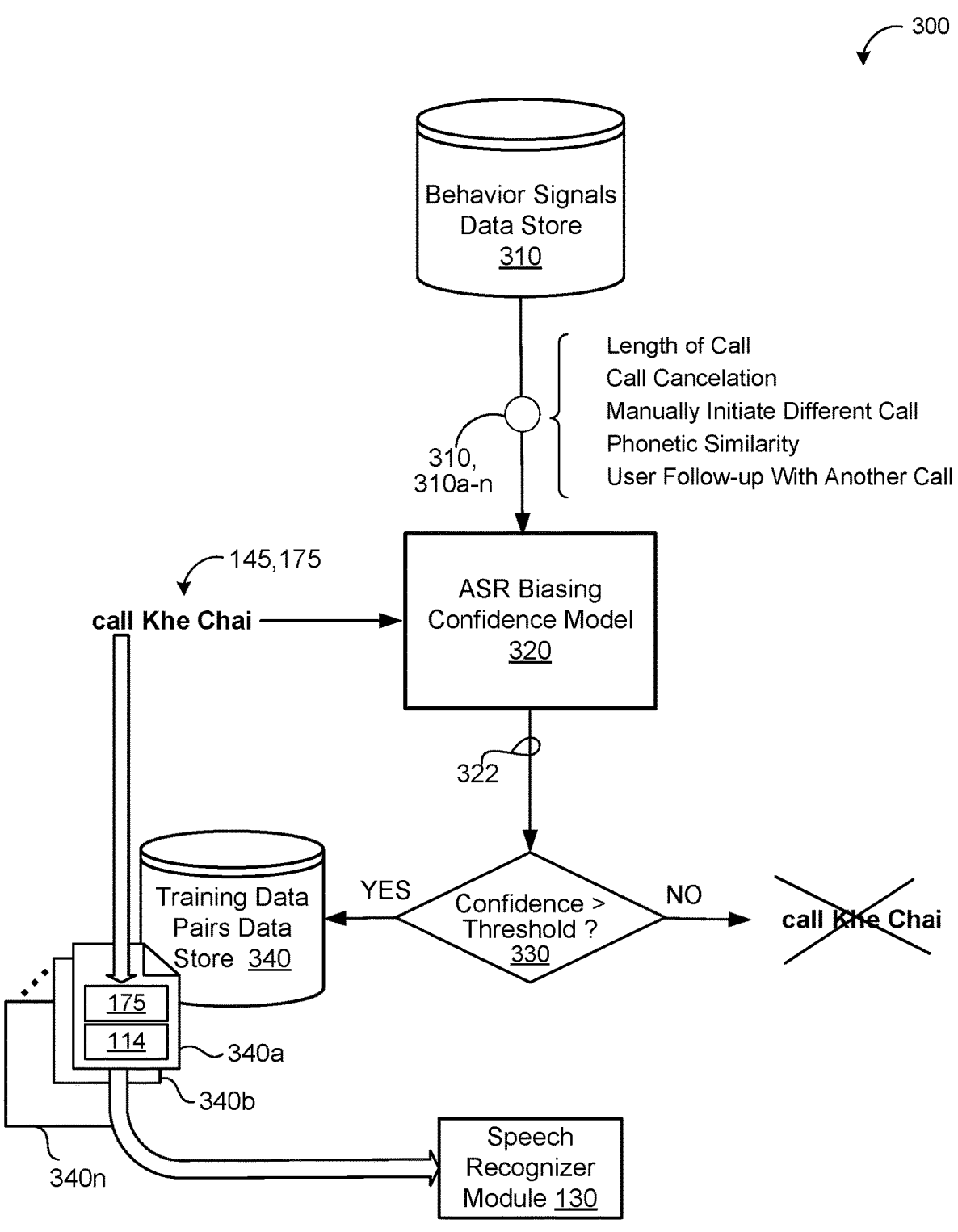
FIG. 3 is a schematic view of an example training process for training a speech recognizer based on biased transcriptions.

Referring to FIG. 3, the user device 110 executes a training process 300 to train the speech recognizer 130 based on the biased transcriptions 175 of the ASR system 105. For a particular biased transcription 175, the training process 300 executes an ASR biasing confidence model 320 to process the corresponding behavior signals 310 of the user 10 captured by the monitoring module 118 responsive to performance of an action specified by the biased transcription 175. The ASR biasing confidence model 320 processes the corresponding behavior signals 310 to determine a confidence score 322 that indicates a confidence or likelihood that the biased transcription 175 was an accurate transcription of a corresponding voice command 101. In some implementations, the ASR biasing confidence model 320 includes a heuristically-based model, or a trained machine learning (ML) model such as a classification model.

When the confidence score 322 for a particular biased transcription 175 satisfies a criteria at operation 330 (e.g., exceeds a pre-determined threshold), the training process 300 generates a personalized training data pair 340 that includes (1) the audio data 114 characterizing the voice command 101 for the biased transcription 175 paired with (2) the biased transcription 175 as a ground truth transcription for the audio data 114. The training process 300 uses the generated personalized training data pair 340 to personalize (e.g., update) the speech recognizer 130 to recognize the biased transcription 175 that includes a biasing phrase 125. In some implementations, the training process 300 caches (i.e., on the memory hardware 112 of the user device 110 or the memory hardware 123 of the computing system 120) the generated personalized training data pairs 340a-n, and batch personalizes the speech recognizer 130 using the cached personalized training data pairs 340 to recognize the biasing phrases 125. In some examples, once the speech recognizer 130 is trained to recognize a biasing phrase 125, the biasing phrase 125 is no longer considered by the lattice augmenter 142 during future biasing, which may decrease computational expense when performing biasing and make it more feasible to implement the ASR system 105 on the user device 110, and/or reduce speech recognition latency to thereby improve user satisfaction. That is, the ASR system 105 may become less dependent on biasing to perform accurate speech recognition for voice commands or other spoken utterances.

For each personalized training data pair 340, the training process 300 personalizes the speech recognizer 130 by processing, using the speech recognizer 130, the audio data 114 for the personalized training data pair 340 to generate one or more predicted transcripts. The training process 300 determines a loss term based on the predicted transcripts and the biased transcription 175 of the personalized training data pair 340, and updates the speech recognizer 130 based on the loss term. For example, the training process 300 updates the speech recognizer to reduce the loss term to teach the speech recognizer 130 to learn a biasing phrase 125 of the biased transcription 175. In some examples, the training process 300 determines the loss term based on the likelihood 155 for the predicted transcription that matches the biased transcription 175. An example loss term is a negative log of the likelihood 155.

FIG. 4 is a flowchart of an exemplary arrangement of operations for a method 400 for training a speech recognizer based on biased transcriptions. The data processing hardware 111 (FIG. 1) of the user device 110 and/or the data processing hardware 122 (FIG. 1) of the computing system 120 may execute the operations for the method 400 by executing instructions stored on the memory hardware 112, 123.

At operation 402, the method 400 includes receiving a biased transcription 175 for a voice command 101 spoken by a user 10 and captured by a user device 110, the biased transcription 175 biased to include a biasing phrase 125 from a set of biasing phrases 125 specific to the user 10. The method 400 includes, at operation 404, instructing an application 118 executing on the user device 110 to perform an action specified by the biased transcription 175 for the voice command 101.

At operation 406, the method 400 includes receiving one or more user behavior signals 310 responsive to the application 118 performing the action specified by the biased transcription 175. The method 400 includes, at operation 408, generating, as output from a confidence model 320, a confidence score 322 of the biased transcription 175 based on the one or more user behavior signals 310 input to the confidence model 320. Based on the confidence score 322 output from the confidence model 320, the method 400, at operation 410, trains a speech recognizer 130 on the biased transcription 175.

Figure 5:
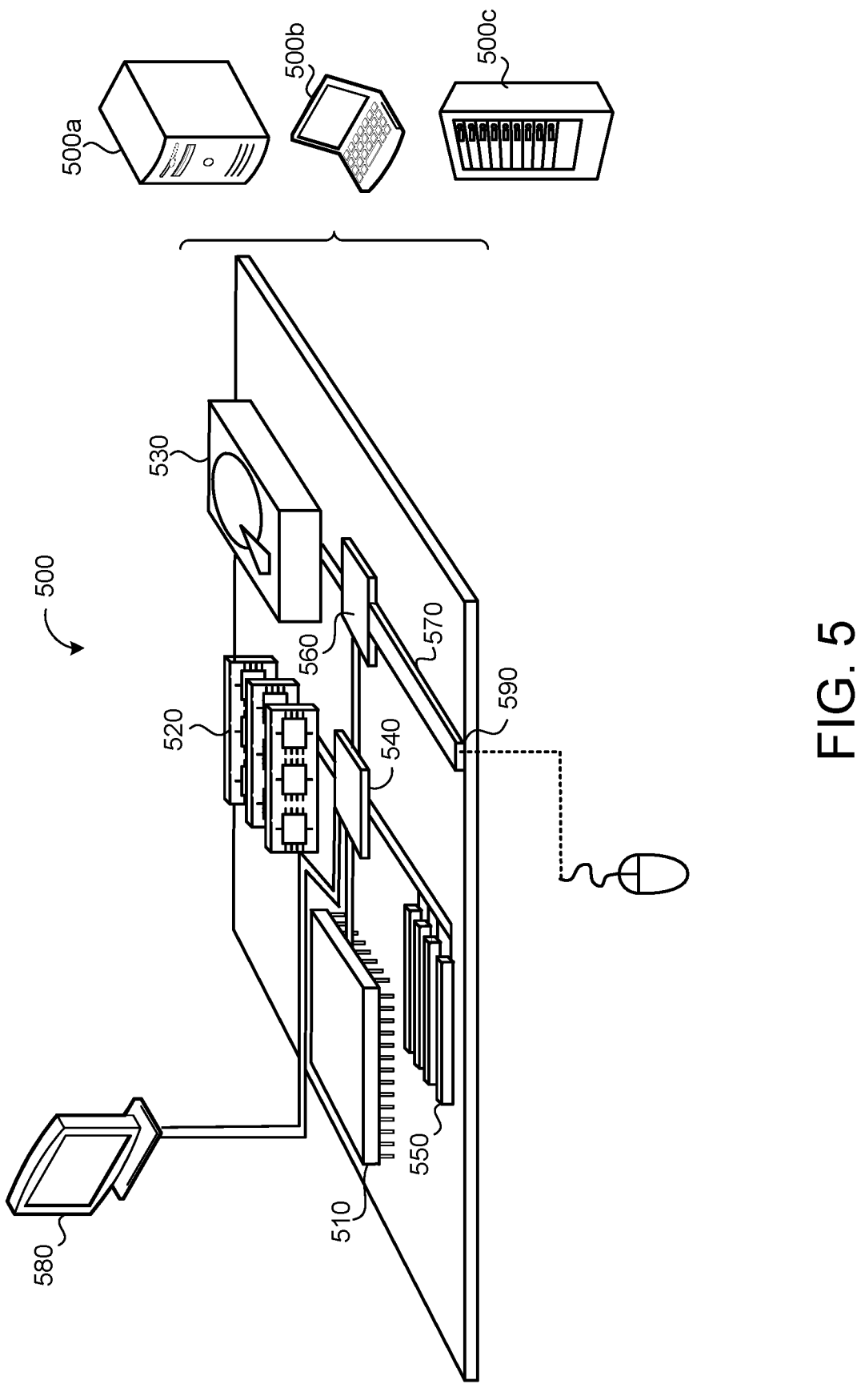
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (i.e., data processing hardware) that may be used to implement the data processing hardware 111 and/or 122, memory 520 (i.e., memory hardware) that may be used to implement the memory hardware 112 and/or 123, a storage device 530 (i.e., memory hardware) that may be used to implement the memory hardware 112 and/or 123, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 may process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500*a*, as a laptop computer 500*b*, or as part of a rack server system 500*c*.

Various implementations of the systems and techniques described herein may be realized in digital electronic and/or optical circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification may be performed by one or more programmable processors, also referred to as data processing hardware, executing one or more computer programs to perform functions by operating on input data and generating output. The processes and logic flows may also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, one or more aspects of the disclosure may be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user may provide input to the computer. Other kinds of devices may be used to provide interaction with a user as well; for example, feedback provided to the user may be any form of sensory feedback, e.g., visual feedback, auditory feedback, or tactile feedback; and input from the user may be received in any form, including acoustic, speech, or tactile input. In addition, a computer may interact with a user by sending documents to and receiving documents from a device that is used by the user; for example, by sending web pages to a web browser on a user's user device in response to requests received from the web browser.

Unless expressly stated to the contrary, the phrase "at least one of A, B, or C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least C; and (7) at least one A with at least one B and at least one C. Moreover, unless expressly stated to the contrary, the phrase "at least one of A, B, and C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C. Furthermore, unless expressly stated to the contrary, "A or B" is intended to refer to any combination of A and B, such as: (1) A alone; (2) B alone; and (3) A and B.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:

receiving a biased transcription for a voice command spoken by a user and captured by a user device, the biased transcription biased to include a biasing phrase from a set of biasing phrases specific to the user;

instructing an application executing on the user device to perform an action specified by the biased transcription for the voice command;

receiving, from a monitoring module executing on the user device, one or more user behavior signals captured by the monitoring module responsive to the application performing the action specified by the biased transcription, the one or more behavior signals representing interactions between the user and the application associated with the application performing the action specified by the biased transcription;

processing, by a confidence model, the received one or more user behavior signals captured by the monitoring module to generate a confidence score of the biased transcription, the confidence score indicating a likelihood that the biased transcription accurately transcribes the voice command;

determining the confidence score satisfies a confidence threshold; and based on determining the confidence score satisfies the confidence threshold, training a speech recognizer on the biased transcription.

2. The computer-implemented method of claim 1, wherein the operations further comprise:

receiving audio data characterizing the voice command captured by the user device;

processing, using the speech recognizer, the audio data to generate one or more candidate hypotheses for the voice command, each candidate hypothesis corresponding to a candidate transcription for the voice command and represented by a respective sequence of hypothesized terms;

identifying, from the one or more candidate hypotheses for the voice command, a particular carrier phrase; and based on the particular carrier phrase, biasing, using a biasing model, the one or more candidate hypotheses toward the set of biasing phrases specific to the user to determine the biased transcription that includes the biasing phrase.

3. The computer-implemented method of claim 2, wherein training the speech recognizer on the biased transcription comprises:

generating a personalized training data pair that comprises the biased transcription paired with the audio data characterizing the voice command; and training the speech recognizer on the personalized training data pair.

4. The computer-implemented method of claim 2, wherein:

the particular carrier phrase comprises a phrase intended to invoke a voice calling application or a messaging application;

the application instructed to perform the action specified by the biased transcription of the voice command comprises the voice calling application or the messaging application; and the set of biasing phrases specific to the user comprises personal contacts of the user.

5. The computer-implemented method of claim 2, wherein:

the particular carrier phrase comprises a phrase intended to invoke a media player application;

the application instructed to perform the action specified by the biased transcription of the voice command comprises the media player application; and the set of biasing phrases specific to the user comprises a list of names present in a content playlist for the media player application.

6. The computer-implemented method of claim 2, wherein:

the particular carrier phrase comprises a phrase intended to invoke a navigation application;

the application instructed to perform the action specified by the biased transcription of the voice command comprises the navigation application; and the set of biasing phrases specific to the user comprises at least one of street names, city names, or relevant points of interest.

7. The computer-implemented method of claim 2, wherein the operations further comprise selecting, based on the particular carrier phrase, the set of biasing phrases from a plurality of sets of biasing phrases.

8. The computer-implemented method of claim 2, wherein the biasing model comprises an external language model.

9. The computer-implemented method of claim 8, wherein the language model comprises a neural finite state transducer.

10. The computer-implemented method of claim 1, wherein the speech recognizer comprises an end-to-end speech recognition model.

11. The computer-implemented method of claim 1, wherein the speech recognizer comprises a language model.

12. The computer-implemented method of claim 1, wherein the confidence model comprises a heuristically-based model or a trained machine learning model.

13. A system comprising:

data processing hardware; and memory hardware in communication with the data processing hardware and storing instructions that when executed on the data processing hardware cause the data processing hardware to perform operations comprising:

receiving a biased transcription for a voice command spoken by a user and captured by a user device, the biased transcription biased to include a biasing phrase from a set of biasing phrases specific to the user;

instructing an application executing on the user device to perform an action specified by the biased transcription for the voice command;

receiving, from a monitoring module executing on the user device, one or more user behavior signals captured by the monitoring module responsive to the application performing the action specified by the biased transcription, the one or more behavior signals representing interactions between the user and the application associated with the application performing the action specified by the biased transcription;

processing, by a confidence model, the received one or more user behavior signals captured by the monitoring module to generate a confidence score of the biased transcription, the confidence score indicating a likelihood that the biased transcription accurately transcribes the voice command;

determining the confidence score satisfies a confidence threshold; and based on determining the confidence score satisfies the confidence threshold, training a speech recognizer on the biased transcription.

14. The system of claim 13, wherein the operations further comprise:

receiving audio data characterizing the voice command captured by the user device;

processing, using the speech recognizer, the audio data to generate one or more candidate hypotheses for the voice command, each candidate hypothesis corresponding to a candidate transcription for the voice command and represented by a respective sequence of hypothesized terms;

identifying, from the one or more candidate hypotheses for the voice command, a particular carrier phrase; and based on the particular carrier phrase, biasing, using a biasing model, the one or more candidate hypotheses toward the set of biasing phrases specific to the user to determine the biased transcription that includes the biasing phrase.

15. The system of claim 14, wherein training the speech recognizer on the biased transcription comprises:

generating a personalized training data pair that comprises the biased transcription paired with the audio data characterizing the voice command; and training the speech recognizer on the personalized training data pair.

16. The system of claim 14, wherein:

the particular carrier phrase comprises a phrase intended to invoke a voice calling application or a messaging application;

19

20 the application instructed to perform the action specified by the biased transcription of the voice command comprises the voice calling application or the messaging application; and the set of biasing phrases specific to the user comprises personal contacts of the user.

17. The system of claim 14, wherein:

the particular carrier phrase comprises a phrase intended to invoke a media player application;

the application instructed to perform the action specified by the biased transcription of the voice command comprises the media player application; and the set of biasing phrases specific to the user comprises a list of names present in a content playlist for the media player application.

18. The system of claim 14, wherein:

the particular carrier phrase comprises a phrase intended to invoke a navigation application;

the application instructed to perform the action specified by the biased transcription of the voice command comprises the navigation application; and the set of biasing phrases specific to the user comprises at least one of street names, city names, or relevant points of interest.

19. The system of claim 14, wherein the operations further comprise selecting, based on the particular carrier phrase, the set of biasing phrases from a plurality of sets of biasing phrases.

20. The system of claim 14, wherein the biasing model comprises an external language model.

21. The system of claim 20, wherein the language model comprises a neural finite state transducer.

22. The system of claim 13, wherein the speech recognizer comprises an end-to-end speech recognition model.

23. The system of claim 13, wherein the speech recognizer comprises a language model.

24. The system of claim 13, wherein the confidence model comprises a heuristically-based model or a trained machine learning model.

* * * * *